Patented May 9, 1950

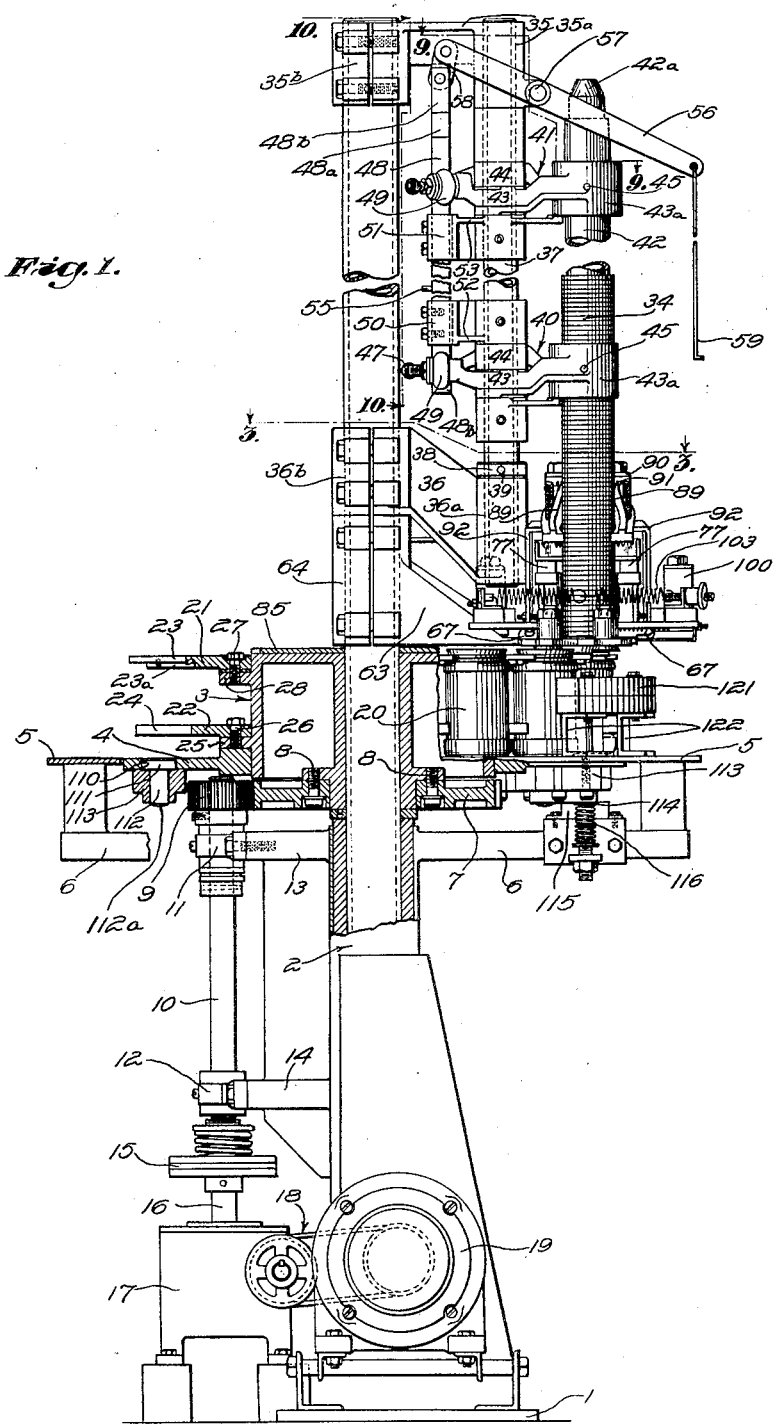

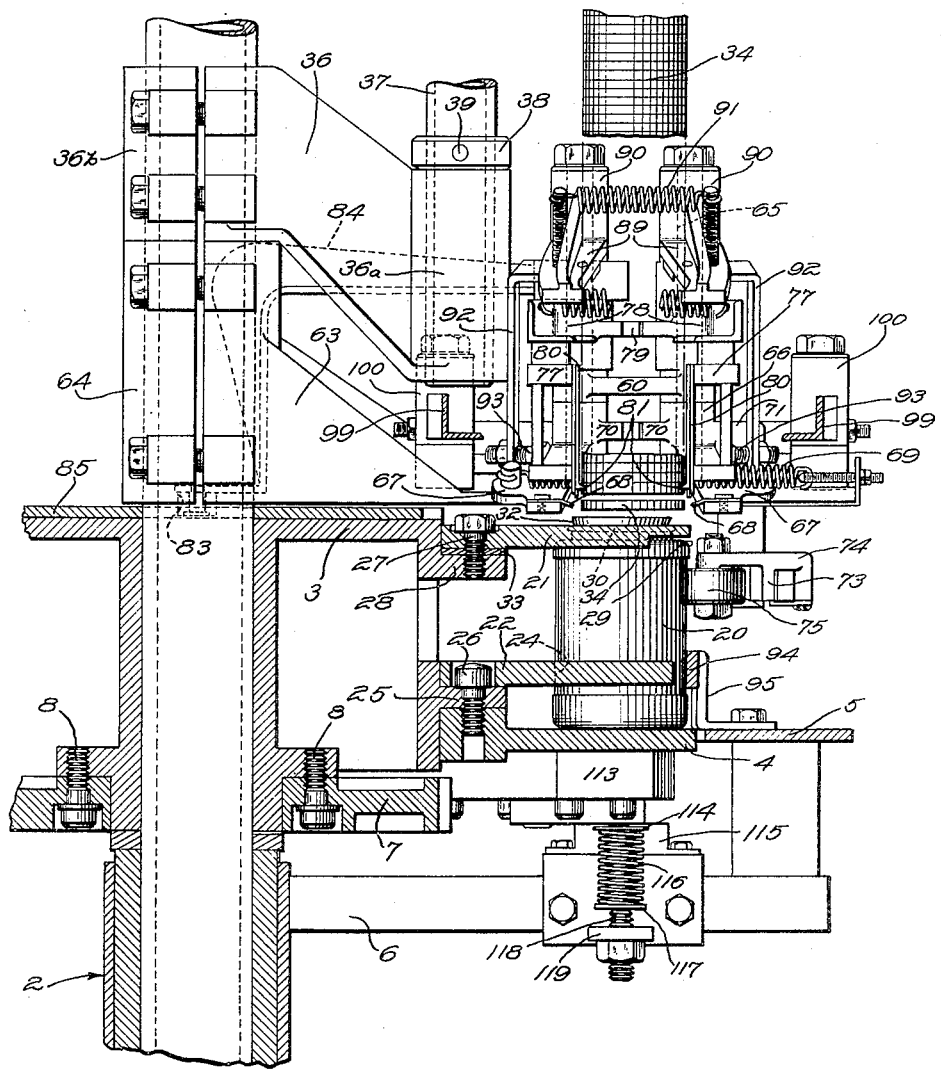

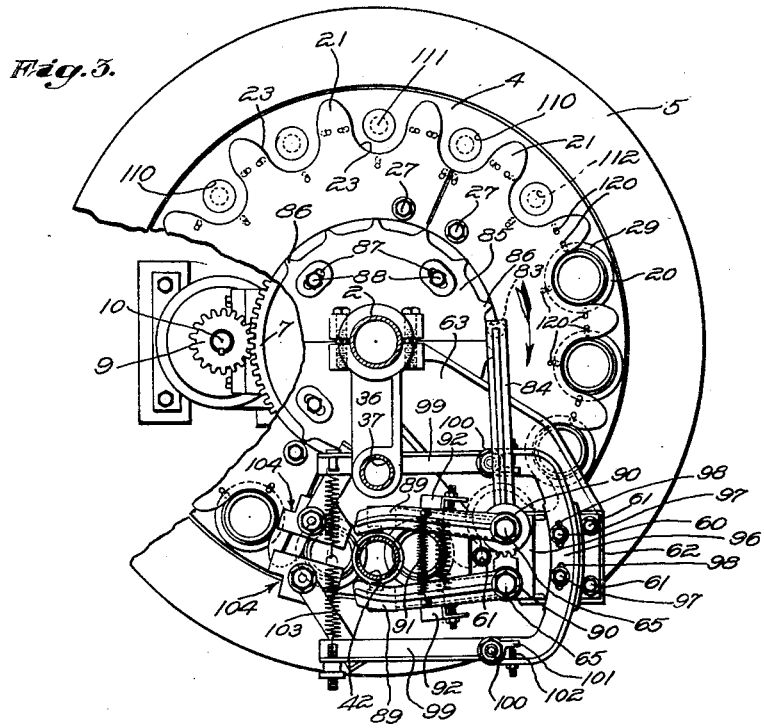
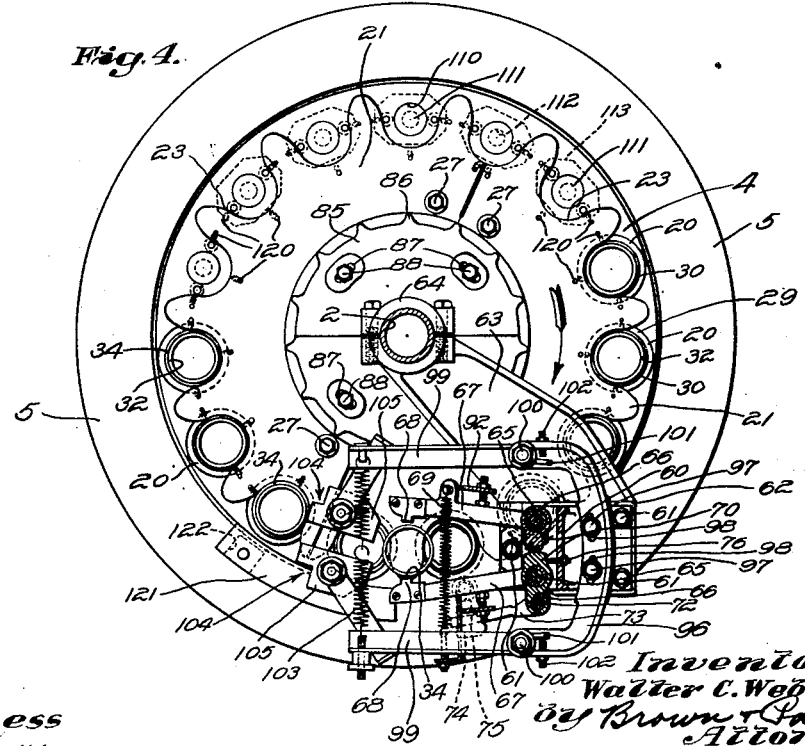

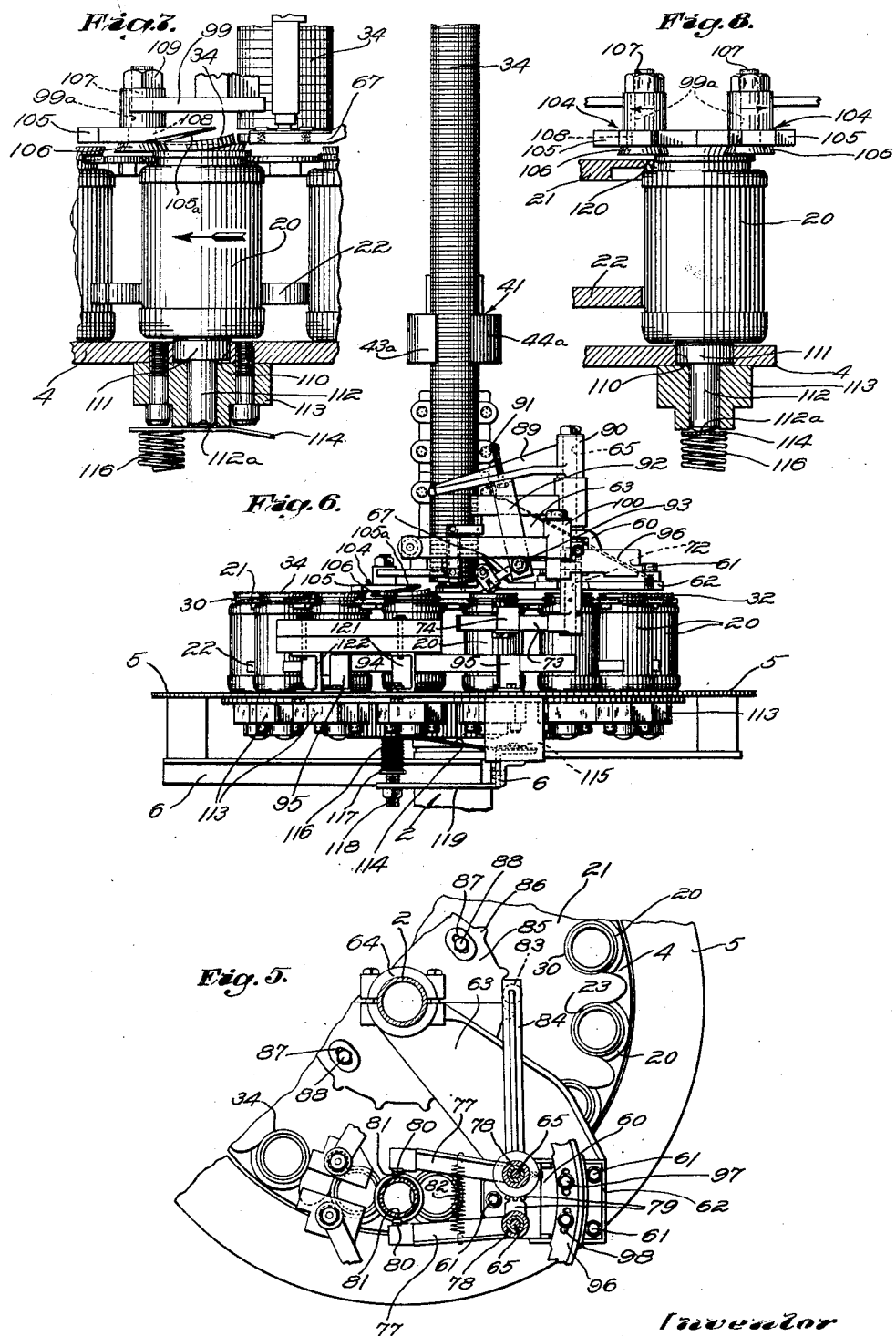

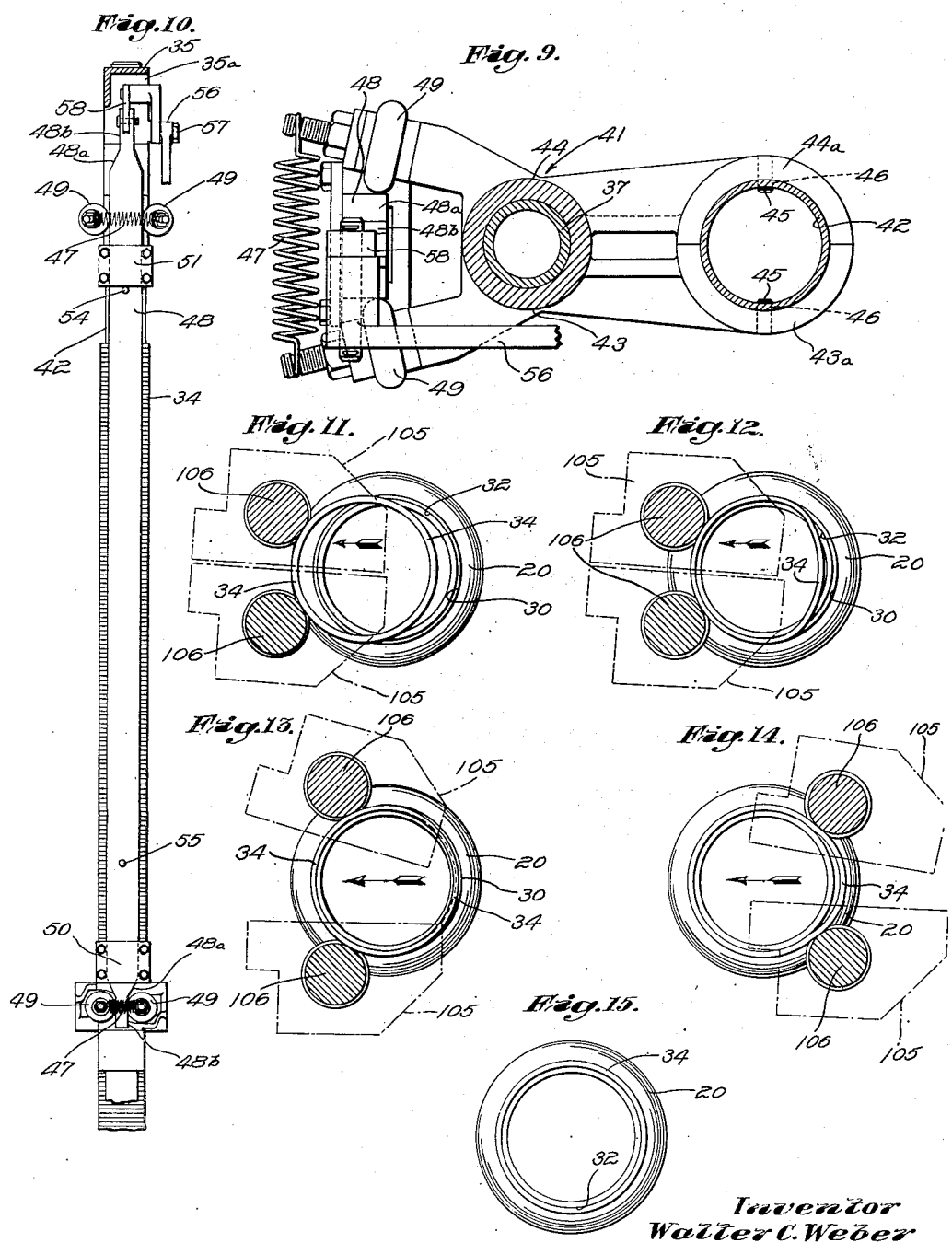

2,507,072

UNITED STATES PATENT OFFICE 2,507,072

MACHINE FOR APPLYING GASKETS TO GLASS JARS OR LIKE ARTICLES

Walter C. Weber, Dayton, Ohio, assignor to Hartford-Empire Company, Hartford, Conn., a corporation of Delaware Application May 27, 1944, Serial No. 537,714

2 Claims. (Cl. 29—235)

This invention relates to improvements in the art of sealing packing containers, such as glass jars, involving the use of sealing gaskets which are placed on the upper end or finish portions of the containers before caps are applied thereto.

It has been usual prior to the invention, so far as I am informed, to place such gaskets on the containers by hand. An object of the present invention is to provide a machine which will do this automatically.

A further object of the invention is to provide a gasket applying machine of the character described which will place gaskets on the containers rapidly and accurately and without injury to the gaskets.

A further object of the invention is to provide a gasket applying machine of the character described which has facilities for simultaneously stretching and applying gaskets of elastic material onto containers which are slightly larger at their gasket receiving portions than the unstretched gaskets.

A further object of the invention is to provide a machine of the character described which has means for moving containers, such as jars, in a series along a predetermined path and for taking individual gaskets successively from a supply adjacent to this path and applying each such gasket to its individual container during the travel of that container along said path.

A further object of the invention is the provision in a machine of the character described of effective means for feeding a gasket from a supply stack to a position appropriate for application of that gasket to a container when that container has been moved along a given path to a predetermined position adjacent to the feeding means.

A further object of the invention is the provision in a machine of the character described of means for moving containers, such as jars, in a series along a given path and gasket feeding means which will act automatically in response to the movement of each such container toward a given position to feed a gasket from an adjacent supply stack to position to be applied to that particular container.

Another object of the invention is the provision in a machine of the character described of a gasket feeding mechanism which will be actuated to feed each of successive lowermost gaskets of a supply stack to a given position in synchronism with the movement of each of a series of containers, such as jars, along a given path toward that position and will retain the lowermost gasket in place in the supply stack at all other times.

A still further object of the invention is the provision in a machine of the character described of a simple, reliable and effective means for acting on each gasket that has been delivered to a particular position adjacent to the top of a moving packing container, such as a jar, to stretch and place that gasket in a stretched condition on the finish portion of that container.

A still further object of the invention is the provision in a machine of the character described of a novel means for supporting a large number of gaskets in a vertical stack above and adjacent to a path along which containers are being moved and so that successive gaskets can be fed from the bottom of the stack at appropriate times and the supply of gaskets constituting said stack can be replenished from time to time without interrupting the operation of the machine.

Other objects and advantages of the invention hereinafter will be pointed out or will become apparent from the following description of an illustrative embodiment of the invention, as shown in the accompanying drawings, in which:

Figure 1 is a view, mainly in elevation, of the gasket applying machine, portions thereof being broken away and other portions being shown in section;

Fig. 2 is a resiliently enlarged fragmentary view, partly in vertical section and partly in elevation, showing details of the mechanism for feeding successive gaskets from the bottom of a supply stack to position to be applied to successive containers as they are moved below the feeding mechanism by a rotating carrier;

Fig. 3 is a view in section through the upper part of the machine at a level above the feeding mechanism and approximately along the line indicated at 3—3 in Fig. 1, a portion of the rotating carrier for the packing containers being broken away to disclose parts of the carrier driving mechanism;

Fig. 4 is a view in horizontal section through the feeding mechanism as seen from a level below that of Fig. 3;

Fig. 5 is a fragmentary horizontal sectional view generally similar to Figs. 3 and 4 but at a level intermediate those of Figs. 3 and 4;

Fig. 6 is a fragmentary view in side elevation of the machine, as viewed from a position approximately 90° from Fig. 1;

Fig. 7 is a relatively enlarged fragmentary vertical sectional view, showing details of the means for stretching and applying a gasket to a container on the rotating carrier;

Fig. 8 is a view like Fig. 7 but taken at an approximate right angle therewith;

Fig. 9 is a relatively enlarged horizontal section approximately along the line 9—9 of Fig. 1, showing details of a clamp for a vertical gasket guiding and supporting member;

Fig. 10 is a vertical section approximately along the line 10—10 of Fig. 1, showing details of a vertical movable double acting wedge rod for controlling the opening and closing movements of a pair of clamps for supporting the vertical gasket supporting and guiding member;

Figs. 11 to 14, inclusive, respectively, are relatively enlarged horizontal sectional views, showing the relative positions at different stages of the operation of wipers which are employed to stretch and apply a gasket onto a moving jar, portions of these wipers which are shown out of their true positions being indicated by dot-and-dash lines; and Fig. 15 is a plan view of the jar after the gasket has been applied thereto.

The framework structure of the machine may comprise a base 1 from which arises a supporting column 2, substantially as shown in Fig. 1. The supporting column may be hollow, for the sake of lightness.

A carrier for the containers to which the gaskets are to be applied may be of the rotating table or turret type and may comprise a hub 3 rotatably mounted on the supporting column 2 at a convenient height above the base 1. The hub 3, which also may be hollow, as shown, carries an annular flat plate or table member 4 which is detachably connected to the hub to rotate therewith about the axis of the supporting column. A stationary flat annular strip or flange 5 may encircle the table plate 4, being supported with its upper surface flush with that of the table plate by any suitable means, as by bracket arms 6 radiating from the lower portion of the supporting column 2. A spur gear 7 is connected to the lower portion of the hub 3, as by cap bolts 8, Fig. 1, in co-axial relation with the hub. The spur gear 7 is in mesh with a pinion 9 on the upper end of a driven vertical shaft 10, Figs. 1 and 3, which may be rotatably mounted in aligned bearings 11 and 12, respectively, on the outer ends of vertically spaced bracket arms 13 and 14 on the supporting column, Fig. 1. The shaft 10 is rotated through a friction clutch 15 by the upwardly projecting drive shaft 16 of a conventional speed reduction unit 17 which has a driven connection, indicated generally at 18, with a motor 19 on the base 1, all as best seen in Fig. 1. The rotary table, 3—4, thus may be rotated about the axis of the supporting column 2 in the desired direction and at the speed desired.

The containers to which gaskets are to be applied, shown as glass jars 20, may rest upon the table member 4 so as to be moved along a given path by the rotating table. These containers may be spaced apart and retained in angularly spaced relation on the table member 4 adjacent to the outer periphery of the latter by suitable container spacing and locating means on the table. Such means may comprise vertically spaced flat annular spider plates 21 and 22, respectively, Figs. 1 and 2, which are carried by the hub of the rotating carrier and which have regularly spaced peripheral recesses 23 and 24, respectively, in their outer edge portions adapted to at least partially receive and embrace the containers 20. As shown, the spider plate 22 is the lowermost of the two spider plates and is detachably secured to an external flange 25 on the lower portion of the hub 3, as by fastening devices such as the cap bolt 26, Fig. 1, so that each peripheral recess 24 in that spider plate is adapted to receive the body of a container 20 at a level below the transverse median line of the container when the latter is resting upon the table plate 4.

The upper spider plate 21 is detachably secured, as by fastening devices such as the cap bolts 27, Figs. 1 to 4, inclusive, on an external flange 28, Figs. 1 and 2, on the upper portion of the hub 3 of the rotating carrier so that each peripheral recess 23 in the spider plate 21 will receive an upper portion of the container standing upon the table plate 4. As best seen in Fig. 2, the peripheral recess 23 receives the relatively reduced upper end or finish portion of the container, above the shoulder 29 thereon. Each recess 23 may be enlarged somewhat at its lower portion, as at 23a, Fig. 1, to fit over the shoulder 29, Fig. 2, of the container. The narrower upper portion of the recess 23 may receive the external flange or bead 30 on the finish portion of the container. The container has an annular gasket receiving surface 32 at the extreme upper end of its finish and this protrudes from the peripheral recess in the top spider plate 21 above the level of the latter, as shown in Fig. 2, for a purpose which will hereinafter be explained. The particular level at which the upper spider plate will be supported and the height thereof above the container supporting table plate 4 of the rotating carrier may be adjusted within limits by interposing annular shim rings between the flange 28 and the superimposed upper spider plate, one such shim ring being shown at 33 in Fig. 2. The upper spider plate thus may be positioned at the proper level to engage at its peripherally recessed portions with the upper end or finish portions of the containers resting upon the table plate 4 at the level on the latter desired and so that the portions of such containers onto which gaskets are to be placed will project suitably above the level of the spider plate. Also, spider plates having peripheral recesses of different sizes and shapes may be used selectively according to the sizes and shapes of the containers to which gaskets are to be applied.

A gasket suitable for application to each of the containers 20 is designated 34 in the drawings and is a ring made of rubber or other suitable material. This gasket, before being applied, may have an inner diameter slightly less than the diameter of the annular surface 32 of the container onto which the gasket is to be placed. Such a gasket may be made of a material having good elasticity, although materials which lack the elasticity and recovery characteristics of natural rubber may be used.

The invention provides means for supporting a stack of the gaskets 34 above the rotating carrier (see Figs. 1, 2, 6 and 7), together with means for feeding each of successive lowermost gaskets of the stack downwardly (see Fig. 2), to a position at which each gasket thus fed will partially overlie the top of the approaching container 20, as shown for the gasket 34 in the lower portion of Fig. 4. On further movement of this container, caused by the rotation of the carrier clockwise as shown by the arrow in Fig. 4, the gasket will be stretched and applied to the upwardly projecting finish portion of the container. The manner in which this is accomplished and the means for doing it will hereinafter be particularly described.

The upper portion of the supporting column 2, above the rotating carrier for the containers, carries vertically spaced laterally projecting upper and lower brackets 35 and 36, respectively, Fig. 1. These have vertically aligned sleeve portions 35a and 36a, respectively, at their outer ends for the reception of the upper and lower end portions, respectively, of a secondary vertical supporting member 37. This also may be tubular, as shown. A collar 38 may be pinned, as at 39, onto the tubular supporting member 37 to rest upon the sleeve portion 36a of the lower bracket 36 and thus to prevent relative vertical movement between the vertical member 37 and the brackets 35, 36. These brackets may be fastened to the main supporting column 2 by suitable fastening devices, such as the clamps 35b and 36b, respectively, Fig. 1, which may be loosened to permit angular adjustment or positioning of the brackets and the parts carried thereby around the axis of the vertical column 2 and then tightened to maintain the adjustment that has been made.

The vertical supporting member 37 carries a pair of vertically spaced clamping devices 40 and 41, respectively, for supporting a vertical guide rod 42 for a supply stack of the gaskets 34. The rod 42 may be hollow, as shown. These clamping devices are alike so that the following description of the upper clamping device 41 will suffice also as a description of the lower clamping device 40, like parts being designated by the same reference characters.

The clamping device 41, Figs. 1 and 9, comprises a pair of levers 43 and 44, respectively, which are pivoted intermediate their ends on the vertical supporting member 37, as shown in Figs. 1 and 9. The levers 43 and 44 are provided at their working ends with cooperative clamping members or jaws 43a and 44a, Fig. 9, adapted jointly to encircle and embrace the member 42 adjacent to but below the upper end of the latter. The jaw members 43a and 44a may be provided with inwardly extending aligned detents or projections 45 adapted, when the jaws are closed, to project through openings 46 in the wall of the hollow member 42 to the interior of the latter, as shown in Fig. 9. The opposite or actuating arms of the levers 43 and 44 are connected at their extremities by a tension spring 47 which tends to swing the levers 43 and 44 about the axis of their pivotal support so as to maintain the jaws of the clamping device 41 spread apart or in open positions.

Opening and closing of the jaws of the two camping devices 40 and 41 are controlled by a vertically movable double action vertical wedge rod 48 which depends between rollers 49 on the rearward, actuating arms of the levers of the clamping devices, as best seen in Fig. 10. The wedge rod 48 has its main or body portion sufficiently wide to hold the rearward, actuating arms of the levers of either or both of the clamping devices apart so as to retain the jaws of one or the other or both of the clamping devices closed upon the gasket supporting and guiding member 42, according to the vertical position of the rod 48 along its path of vertical movement. The wedge rod tapers, as at 48a, adjacent to each of its opposite ends, so that its extreme end portions, indicated at 48b, are sufficiently narrow to permit opening of the jaws of either clamping device when the rollers of that device are in contact with a narrow end portion of the wedge rod. The wedge rod is guided so as to move only in a predetermined vertical path by the guiding sleeves 50 and 51 which respectively are provided at the outer ends of vertically spaced bracket arms 52 and 53, respectively, on the upright supporting member 37. The wedge rod carries an upper stop pin 54 and a lower stop pin 55. When the wedge rod is at the upper limit of its possible vertical movement, the stop pin 54 will be located against the guiding sleeve 51 and the pin 55 will be above the lower guiding sleeve 50. At this time, the rollers on the actuating arms of the levers of the lower clamp 40 will be spaced apart by the narrow lower end portion of the wedge rod and the lower clamp will be open. The upper clamp, 41, will be closed as the rollers on the actuating arms of the levers of that clamp will be spaced apart by the wider body portion of the wedge rod. The wedge rod may be moved downward from this position, which is as shown in Fig. 10, until the stop pin 55 strikes the top of the guiding sleeve 50. Before this happens, however, the rollers on the lower clamping device will ride up the tapered portion 48a near the lower end of the wedge rod onto the wider body portion thereof to close the lower clamping device while the upper clamping device is still closed. In other words, the vertical distance between the rollers of the two clamping devices is slightly less than the length of the body portion of the wedge rod and the path of vertical movements of the wedge rod is so located and of such length that the wedge rod may be lowered or raised to effect closing of both clamping devices and then further, if desired, to cause opening of one of the clamping devices while the other is kept closed. Mechanism for raising and lowering the wedge rod may comprise a lever 56 which is pivoted intermediate its length, as at 57, Figs. 1 and 10, on the sleeve portion 35a of the bracket 35. This lever is connected pivotally at one end with a link 58 which is in turn pivotally connected with the upper end of the wedge rod. A push and pull wire 59, Fig. 1, or other handle may be connected to the free end of the lever 56 for convenient manual operation of the latter.

The upper end portion of the hollow rod 42 may be tapered, as indicated at 42a, to facilitate loading of gaskets 34 onto it. For the gasket loading operation, the upper clamping device 41 may be opened while the lower clamping device 40 is closed to support the hollow rod 42. Gaskets 34 may then be stacked onto the rod 42 against the closed jaws of the lower clamping device until the stack reaches nearly to the level of the upper clamping device. The upper clamping device may then be closed to take over the support of the rod 42 and the lower clamping device opened to permit the gaskets to slide down on the member 42 to the lower end of the latter. It will be understood that the gasket feeding means, presently to be described, for feeding gaskets from the lower end of the stack will retain the lowermost gasket of the stack against falling from the lower end of the rod 42 until it is desired to feed such gasket downward. Gaskets may be placed on the member 42 to provide a supply stack sufficiently high to extend thereon above the lower clamping device 40 to or nearly to the level of the upper clamping device 41. More gaskets can be added during operation of the machine to maintain an adequate supply of gaskets on the rod 42 at all times.

The supporting structure of the gasket feeding mechanism comprises a bracket 60, Figs. 3 to 6, inclusive, fastened, as by cap screws 61, onto the substantially flat outer end portion 62 of a bracket arm 63 which is secured by a clamping device 64, Figs. 1, and 2 to 5, inclusive, onto the tubular main supporting column 2. The bracket 60 carries a pair of spaced parallel short vertical shafts 65, Figs. 3, 4 and 5. Pivotally mounted on the lower portions of these shafts 65 are the hubs 66, Figs. 2 and 4, of levers 67, Figs. 1, 2 and 4, which have their outer free end portions disposed at opposite sides of the bottom of the supply stack of gaskets 34. These are provided with cooperative laterally extending supporting fingers 68, Figs. 2 and 4, adapted to partially underlie and to support the lowermost gasket 34 of the stack when the pivoted levers 67 are at the limits of their swinging movements about their pivotal axes toward each other or in what may be termed their closed positions. A coil spring 69, best seen in Figs. 2 and 4, connects the levers 67 and tends to maintain them closed. The lever hubs 66 have short enmeshed lateral gear segments 70, Figs. 2 and 4, for causing the lever arms to swing in unison but in opposite directions when one of them is actuated. The hub of the outer of these two levers is provided with a short outwardly extending actuating lug 71, Fig. 2, connected by a pin 72, Figs. 4 and 6, rigidly to one end of a trip arm 73, Figs. 2, 4 and 6. The trip arm carries a holder 74, which is adjustable along the length thereof, for a roller 75, which is adapted to bear against the side of each container 20 on the rotating carrier of the machine, as best seen in Fig. 2, when that container has been brought by the rotation of the carrier to a position adjacent to but short of axial alignment with the stack of gaskets 34.

The outward swinging movement of the trip arm 73 by the contact of the oncoming container 20 with the roller 75 of the trip device will cause opening of the levers 67 to release the lowermost gasket 34 of the stack. This gasket then will fall onto the upper spider plate of the rotating carrier so as to partially overlie the top of the container which has actuated the trip mechanism, as shown for the gasket 34 at the lower portion of Fig. 4. The closing movements of the levers 67 are limited by the contact of an adjustable stop screw 76 with the side of one of the short gear sectors 70, the stop screw being carried by a suitable portion of the bracket 60 as shown in Fig. 4.

The gasket feeding mechanism also comprises means for engaging the second gasket from the bottom to prevent downward feeding of more than the lowermost gasket when the gasket supporting fingers 68 have been withdrawn from their supporting positions by the opening of the levers 67. Such means comprises a pair of levers 77, Figs. 1, 2 and 5, having hub portions 78, Figs. 2 and 5, mounted on higher portions of the aforesaid short vertical shafts 65 and connected to turn in unison in opposite directions about their respective pivotal axes by short laterally extending enmeshed gear segments 79. The outer, free end portions of the levers 77 carry grippers 80 at their inner sides, these grippers including pointed projections 81 suitably located to press against opposite sides of the second gasket from the bottom of the stack so as firmly to retain it in place on the vertical guide rod 42 when the levers 77 are closed. A coil spring 82, best seen in Fig. 5, connects the levers 77 and tends to maintain them in their closed positions. The extent of opening and closing movements of the levers 77, the times of such opening movements and the duration of the intervening periods during which they remain closed are controlled by the coaction of a cam follower 83, on the outer end of a rocker arm 84 on the hub of the inner of the two levers 77, with a cam 85 which rotates with the rotary carrier of the machine. This operating mechanism is best seen in Figs. 3 and 5. The cam 85 is mounted upon the hub 3 of the rotary carrier so as to be rotated by the latter and so that angular adjustment of the cam in relation to the carrier can be effected within limits to adjust the positions of peripheral projections 86 on the cam relative to the angularly spaced container positioning pockets which are provided by the peripheral recesses in the spider plates of the rotating carrier, there being a peripheral projection 86 on the cam for each such pocket. To this end, the cam 85 may be provided with arcuate slots 87 through which extend the shanks of cap bolts 88 by which the cam is secured to the hub of the rotating carrier. Each of the cam projections 86 actuates the rocker arm 84 to open the levers 77 to disengage the interposed gasket 34. By the structural and operating arrangement just described, the levers 77 will be opened only when the lower supporting fingers 68 on the levers 67 are closed so as to permit the next gasket in line to move slightly downward onto the supporting fingers 68 after the preceding lowermost gasket has been fed downward from the bottom of the stack.

The gasket feeding mechanism also includes means for gripping one or more of the gaskets of the stack a short distance above the lower end of such stack so as to lessen the weight on the lowermost gasket supporting fingers 68 when the levers 77 are open and also to lessen the weight on the grippers for the second gasket from the bottom of the stack when all the gasket supporting and gripping instrumentalities are closed. This weight relieving means comprises a pair of levers 89, Figs. 1, 2 and 3, having hub portions 90 pivotally mounted on the upper portions of the aforesaid short vertical shafts 65. The outer, free end portions of these levers 89 are adapted to grip between them one or more of the gaskets of the stack at a short distance above the intermediate levers 77 when the levers 89 are closed. A coil spring 91 connects the levers 89 and tends to keep them closed.

The levers 89 may be opened and closed in unison with the lower levers 67, which carry the supporting fingers 68 for the lowermost gasket of the stack. This may be accomplished by providing the levers 89 with depending rigid arms 92, the lower portions of which carry adjustable contact pieces 93, shown as bolts bearing against the outer sides of the levers 67 and best seen in Fig. 2. Thus, when the levers 67 are opened by the container actuated trip mechanism previously described, the levers 89 also will be opened. When the levers 67 are closed by their connecting spring 69, the connecting spring 91 of the upper levers 89 will simultaneously close the upper levers.

An arcuate guard bar 94 may be supported on the marginal plate 5, Figs. 2 and 6, as by brackets 95, Fig. 6, for retaining the containers 20 in their pockets on the rotating carrier during the period of their travel in which each such container will act upon the roller 75 of the trip-off device for the gasket feeding mechanism.

The gasket-applying mechanism may comprise a supporting yoke 96 of substantially C-shape in plan, as best seen in Figs. 3 and 4. This yoke may be adjustably mounted on the bracket 60, as by cap bolts 97 having their shanks extending downwardly through slots 98 in the web of the yoke into the underlying bracket so that the arms of the yoke extend toward but at opposite sides of the lower portion of the stack of gaskets 34. Horizontally swingable levers 99 are pivoted adjacent to their rearward ends, as at 100, to the yoke arms to extend past the lower portion of the stack of gaskets at opposite sides thereof. These levers have short rearward arms or tail pieces 101 at the inner sides of the arms of the yoke 96 for contact with adjustable stops 102, shown as threaded studs or bolts carried by the arms of the yoke, to limit the extent of swinging movements of the levers 99 toward each other. A tension coil spring 103 connects the levers 99 so as to tend to swing them toward each other until the tail pieces of the levers strike the adjustable stops 102.

The free end portions of the levers 99 carry wipers 104 which are adapted to cooperate with each other and with the projecting upper end portion of a moving container 20 on the rotating carrier to place an interposed gasket 34 on the projecting upper end portion of the container during the movement of the container between these wipers. Each wiper 104 may comprise a gasket top surface wiping member 105, of plate-like form, and a gasket side surface wiping member 106, of circular configuration in cross section. The gasket side surface wiping member 106 may have an attaching stem or shank, indicated at 107 in Figs. 7 and 8, extending through a suitable hole 108 in the gasket top surface wiping plate 105 and a suitably apertured outer end portion 99a of the supporting lever 99 into threaded engagement with a nut 109 which may be tightened to fasten the lever 99, the gasket top surface wiping plate 105 and the gasket side surface wiping member 106 rigidly together. In this construction, the gasket side surface wiping member 106 is rigid with the top surface wiping plate and with the supporting lever but obviously the construction may be modified in any suitable known way to permit rotation of the side surface wiping member 106 about its vertical axis, as in the manner of a roller, if this should be desired.

When the levers 99 are in their inwardly swung or closed positions, the adjacent side edges of the gasket top surface wiping plates may be close together, or even in contact with each other, as shown in Fig. 8. The levers 99 are of suitable length and shape—the outer end portions thereof being turned downwardly and forwardly in the examples shown—to position the wipers close to the upper spider plate 21 of the rotating carrier and so that the line of travel of the projecting upper end portion of each of the containers on the rotating carrier will pass midway between the gasket side surface wiping members 106 and directly beneath the top surface wiping members 105 of the wipers. The adjustable connection of the yoke 96 with its supporting bracket permits some adjustment of the positions of the wipers to assure accurate pre-setting thereof. The gasket top surface wiping plates may be beveled at their undersurfaces from the edges thereof which are turned toward the gasket feeding mechanism, as indicated at 105a in Fig. 7.

When the wipers 104 are in their closed positions, as just described, the distance between the gasket side surface wiping members 106 is less than the diameter of the projecting upper end portion 32 of the container onto which a gasket 34 is to be placed. The gasket receiving surface of this particular container is downwardly tapering, as clearly shown in Fig. 2, and the side wiping member 106 therefore may be upwardly tapering to match.

The operation of applying a gasket to the gasket receiving surface of a container by the mechanism just described will be readily understood. The positions at a number of different stages of such operation of the elements involved are shown in Figs. 11 to 14, inclusive. In these views, the wiping plate members 105 are indicated by dot-and-dash lines because, as shown by Figs. 7 and 8, for example, they actually are located above the plane at which each of Figs. 11 to 14, inclusive, is taken.

Rotation of the carrier will move each container thereon to which a gasket is to be applied toward the closed wipers. The gasket which partially overlies the projecting upper end of the container will be held in position to be hooked over the leading edge of such upper end portion of the container as the latter is moved by the carrier beneath the top surface wiping plates 105 along a path extending between the side surface wiping members 106, substantially as shown in Fig. 11. The continued movement of the container relative to the gasket and to the wipers will cause the gasket to be laid partially around the projecting upper end portion 32 of the container, substantially as shown in Fig. 12, by the time the wipers start to move apart. It will be noted that the top wiping plates slide across the upper edge of the container and thus hold the gasket against riding up over the edge of the container. As the movement of the container continues, the wipers will be spread apart, as to and past the positions shown in Fig. 13. Subsequently, the wipers will move toward each other as the container passes through the space between them, as to and past the position shown in Fig. 14. The gasket thus will be laid over the upper end portion of the container, being stretched if required in order to fit onto the container. The applied position of the gasket on the upper end portion of the container is shown in Fig. 15.

The machine includes means for applying a lifting force to the container while the gasket is being applied thereto. This may be desirable to assure the proper relationship between the upper edge portion of the container and the gasket top surface wiping plates and also to aid in holding the container steady as it moves between and spreads the wipers. As shown, Figs. 1, 3, 4, 7 and 8, the table plate 4 of the rotary carrier is provided with an opening 110 in each portion thereof on which a container 20 will stand. This opening 110 is adapted to accommodate the head 111 of a vertically movable lifter, the shank of which, designated 112, may depend through a suitably apertured guide block 113 that is attached to the bottom of the table plate 4. The lifter shank 112 has a rounded bottom portion 112a projecting below the block 113. When the lifter is at the limit of its downward movement, the upper surface of its head may be flush with the upper surface of the table plate so that the container rests upon both the head of the lifter and the surrounding portion of the table plate. However, just before the container to which a gasket is to be applied arrives at the gasket applying station, the rotation of the carrier will move the lifter for that particular container upon a flat spring bar 114, which is anchored at one end in a clamp 115 on the bracket arm 6, Figs. 2 and 6. This spring bar 114 is pressed upwardly adjacent to its free end by a coil spring 116. The spring 116 is interposed between the spring bar 114 and a spring supporting and tension adjusting device which may comprise a flat disk 117 on the upper end of a threaded stud 118 carried by a projecting arm 119 on the clamping device 115. The container may be raised slightly above the table plate 4, as to the position shown in Figs. 7 and 8, for example, by the action of its spring impelled lifter when such container is being moved along the portion of its path of movement at which a gasket is to be applied thereto. To limit the upward movement of the container by the lifter, stop pins, indicated at 120, Figs. 3, 4 and 8, may be provided in the upper spider plate 21 of the conveyor adjacent to the edge of the narrower portion of each peripheral recess 23 therein and at spaced apart points around such recess so as to engage with the upwardly facing shoulder of the container 20 when the latter has been raised to the extent desired. Obviously, the container might be raised against the edge of the peripheral recess in the upper spider plate instead of against stop pins located adjacent to this edge. The stop pins are considered preferable to compensate for slight possible variations in the upper portions of different containers of the same general kind or in the walls of different peripheral recesses in the upper spider plate.

A second or auxiliary arcuately curved guard bar 121 may be mounted, as by brackets 122 on the marginal strip 5, Figs. 1, 4, and 6, in a position at the outer edge of the rotating carrier to prevent outward movement of each container from its peripheral pocket in the rotating carrier during the period of travel of the container in which a gasket is applied thereto. The guard bar 121 may be located at a higher level on the body of the container than the guard bar 94.

A machine of the invention may be used to apply gaskets to the upper end portions of glass jars or to upwardly projecting annular walls of other similar articles. The articles to which the gaskets are to be applied may be loaded into the pockets of the rotating carrier by hand or by the use of any suitable known mechanism for accomplishing this result. Similarly, the articles, after the gaskets have been applied thereto, may be removed from the rotating carrier by hand or by any suitable known unloading device. The carrier and the means for positioning thereon the articles to which gaskets are to be applied may vary widely in construction and mode of operation.

I do not wish to be limited to the details of the illustrative machine shown in the accompanying drawings and herein particularly described, as various modifications thereof and changes therein will now be obvious to those who are skilled in the art.

I claim:

1. In a machine of the character described, gasket applying means comprising a pair of horizontally swingable, openable and closable, pivoted wipers, each comprising a plate-like gasket top surface wiping member and a gasket side surface wiping member depending therefrom, means for moving the upper end portion of a hollow article, such as a jar, having an annular gasket hooked over the leading edge thereof, horizontally between the depending side surface wiping members and directly beneath the top surface wiping members, and means yieldingly resisting opening movements of said wipers by said upper end portion of the hollow article and tending to maintain the wipers in closed positions in which their depending side surface wiping members are spaced apart a distance less than the diameter of the upper end portion of said hollow article, substantially as and for the purpose described.

2. A machine for applying annular gaskets to the upper end portions of shouldered articles, such as jars, comprising a carrier mounted to rotate about a vertical axis, said carrier comprising a substantially flat table on which such articles may stand in upright position, said carrier including a substantially horizontal spider plate located above said table and having regularly spaced open recesses in its peripheral edge portion for the reception of the respective articles standing on said table at levels above their shouldered portions and below their extreme upper end portions which project above the spider plate, means for rotating said carrier about its vertical axis, means for feeding annular gaskets for the articles from an overhead supply onto the carrier so that each gasket thus fed rests partially on said spider plate and partially on the top of the rearwardly disposed adjacent article on the carrier when that article is at a predetermined point around the axis of rotation of the carrier, gasket wiping means located above said carrier in advance of said predetermined further movement of that article by the rotation of the carrier to dispose the gasket in position to encircle the upper end portion of said article, said carrier including vertically movable lifter heads beneath the articles standing on the carrier table, said lifter heads having shanks depending slidably through openings in the table below the latter, a spring-raised bar located beneath a portion of the rotating table to bias each shank and its lifter head upwardly to raise the superposed article above the table during the portion of the cycle of rotation of the carrier in which a gasket is applied to the upper end portion of that article, and stop means carried by said spider plate for engaging with the shouldered portion of the raised article to limit the upward movement of the latter relative to the carrier.

WALTER C. WEBER.

REFERENCES CITED

The following references are of record in the file of this patent:

UNITED STATES PATENTS

| Number | Name | Date |
|---|---|---|
| 1,440,246 | Sharp | Dec. 26, 1922 |
| 1,446,359 | Thom | Feb. 20, 1923 |
| 1,861,889 | Stoll | June 7, 1932 |
| 1,990,148 | Tevander | Feb. 5, 1935 |
| 2,086,371 | Tear | July 6, 1937 |
| 2,304,436 | Bell | Dec. 8, 1942 |
| 2,304,437 | Bell | Dec. 8, 1942 |
| 2,359,575 | Norman et al. | Oct. 3, 1944 |
| 2,374,358 | Kling et al. | Apr. 24, 1945 |